Patented Mar. 28, 1950

2,502,029

UNITED STATES PATENT OFFICE 2,502,029

PREPARATION OF MODIFIED SOY PROTEIN

Louis Sair, St. Louis, Mo., and Richard Rathman, Decatur, Ind., assignor to Central Soya Company, Inc., Fort Wayne, Ind., a corporation of Indiana No Drawing. Application January 26, 1946, Serial No. 643,746

3 Claims. (Cl. 99—14)

This invention relates to the preparation of modified soy protein, and more particularly to modified glycinin which is adapted for use as a whipping agent for the preparation of nougats, fudge, divinity and cream candies, meringue powders, and other food uses. The method and product are also obviously applicable to other uses.

This application constitutes a continuation, in part, of our co-pending application Serial Number 614,442, for the Preparation of modified soy protein.

An object of the invention is to provide a method for the production of a modified soy protein having superior whipping qualities and which results in a foam of greater stability. Yet another object is to provide a method wherein the extraction process may be carried on at a much lower temperature than heretofore employed. A further object is to provide a method for producing a rapid settling of the glycinin in the separation operation. Other specific objects and advantages will appear as the specification proceeds.

In general, the treatment of the soy protein may be in a series of steps including the isolation of the glycinin from soybean meal, the precipitation of the glycinin from the water-soluble extract at or near the isoelectric pH range of the glycinin, the washing of the precipitated glycinin, the enzymatic modification of the glycinin, and the termination of enzymatic modification. Other steps may include the use of a relatively high pH in the alkaline extraction operation and at a relatively low temperature, the dilution of the solids in the glycinin curd, the dilution of solids at the time of centrifuging, if centrifuging is employed, and the raising of the pH at the time of centrifuging and drying.

The first step of the process, in which the desired soy protein is separated from the other constituents of the meal, has to do with the extraction of the meal in the form of oil-free flakes or in other comminuted form with an alkaline solution at a pH substantially different from the isoelectric point of the glycinin. The isoelectric range of the glycinin is in the neighborhood of a pH of 4.2–4.6, and the extraction liquor should have a pH definitely above this range and up to a pH of around 10.5. Sodium sulfite and caustic soda were used for raising the pH to the desired point, but any suitable alkali may be employed for this purpose. We have found that a pH of 8–10.5 is highly desirable because with the higher pH values, lower temperatures can be maintained. For example, instead of extracting at a pH of between 6 and 8 at a temperature of 130° F., we find that we can obtain improved results by extracting at a pH of from 8–10.5 at temperatures of 80–85° F. There is, thus, a substantial saving in heating and equipment heretofore required in the heating process may be eliminated.

We find that particularly good results are obtained where the pH is maintained between 8 and 9. Not only do these pH values permit the use of room temperature or temperatures around 80–85° F., but also they produce a better separation in subsequent operations and increase the keeping qualities of the processed materials. A plant operation at 85° F. and with a pH of 8.5 has given excellent results.

After the extraction in the alkaline medium has proceeded, preferably under agitation, for a period of an hour or so, we stop the agitation and allow the slurry to settle for a substantial period. Usually in about 3 hours, the insoluble material settles to one-half of the total liquid volume. The clear solution lying above the suspended matter and which comprises one-half the original volume of the slurry is then withdrawn without disturbing the suspension. We prefer to add an equal volume of water to the suspension in the tank and agitate the mass again for a period of 30 minutes or so, still maintaining the pH at around 8 or above. A settling operation again produces a suspension and the supernatant liquid is removed.

The two clear solutions obtained as above described are then combined and the pH lowered to about 4.2 to bring about a precipitation of the glycinin while leaving the albumins, sugars, salts and other bodies in solution. We allow the precipitated protein to settle for a period of 8 hours or so to produce a curd consisting mainly of the globulin glycinin.

The next main step of the process has to do with enzymatic modification of the curd obtained as above described. In this operation, we prefer to add sufficient water to the curd to reduce the total solids to a suitable lower point in the neighborhood of 7.5%.

The enzymatic modification may be carried out through the use of any suitable proteolytic enzyme. Pepsin has been found unusually satisfactory and when it is used, a pH in the neighborhood of 2-3 and a temperature of 100-110° F. is preferred. We have found that especially good results are obtained where we use 0.3% pepsin and employ a pH of 2.0. Adjustment of the pH may be made by the addition of any suitable acidifying agent, such as hydrochloric, sulphuric or phosphoric acids.

By carrying out the enzymatic modification with the solids content of the glycinin curd solution in the neighborhood of 7.5% by weight and with 0.3-0.5% by weight of commercial 1:10,000 potency pepsin at a pH of 2 and a temperature of 100° F., excellent results were obtained after agitation for 1½ hours.

At the end of the above enzymatic operation, we prefer to stop the action of the enzyme by raising the pH to a point at which the enzyme is no longer active, say to about 4.0.

The product may, after the enzymatic treatment be spray dried or dried in any other suitable manner. For certain uses, and particularly where the maximum whipping ability is required, we prefer to centrifuge the solution to remove insoluble protein and other materials and to produce a clear solution which may be spray dried in a stream of hot air or dried in any other suitable manner. Any suitable means of separation such as filtering, settling, etc., may be used.

We find that if the pH of the material is raised to 5-5.5 and maintained in this range during centrifuging that a much better yield is obtained and the product has much greater stability. For example, a pH within the range of 5-5.5 has been found to give the improved results; we prefer to maintain the pH during the centrifuging operation, as well as during the drying operation thereafter, at about 5.2. The slight alteration in pH from 4.5, as employed in prior practice, to the increased pH described above, substantially increases the soluble nitrogen content of the product. The additional protein solubilized imparts a tenderness to frappés not otherwise obtained.

In addition to the desired pH of around 5.2 at the time of centrifuging and drying, we prefer to have the dissolved solids content of the liquor to be clarified in the range of 5-6%. In other words, the liquor freed from suspended matter should have a concentration of 5-6% or lower.

After obtaining a clear solution in the centrifuging operation, we prefer to dry the solution, by spray drying in a stream of hot air or by any other suitable means, with the pH at 5.2 or in that neighborhood.

A specific example of the process may be set out as follows:

To 430 lbs. of water at 85° F. was added 0.73 lb. of sodium sulfite and sufficient caustic soda to obtain a pH of 8.5. 36 lbs. of solvent extracted soy bean flakes were then added to this solution while maintaining the pH at 8.5 with additional caustic soda. The slurry of flakes and solution was then agitated for a period of one hour during which the pH was maintained at 8.5. Agitation was then stopped and the slurry was allowed to settle for a period of three hours during which time the insoluble material had settled to one-half of the total liquid volume. The clear solution lying above the suspended matter comprising one-half the original volume of the slurry was removed without disturbing the suspension below it.

To the suspension in the tank was then added an equal volume of water and the entire contents of the tank were well agitated for a period of thirty minutes. The pH of the slurry at this point was 8.4. Again the suspension was allowed to settle for a period of three hours and the supernatant clear liquid consisting of one-half of the total volume was removed as previously.

The two clear solutions obtained were combined and by the addition of hydrochloric acid the pH of the solution was lowered to 4.2. By this step the major portion of the glycinin contained in the solution was precipitated while leaving the albumins, sugars, salts and other bodies in solution. The precipitated protein was allowed to settle for eight hours to produce a curd containing 12% total solids the major portion of which was the globulin glycinin.

The enzymatic modification of the curd was carried out as follows: Sufficient water was added to reduce the total solids in the curd to approximately 7.5%. Then 0.33% pepsin and sufficient 10% hydrochloric acid was added to the curd to reduce the pH of the mixture to 2.0. The temperature was maintained at 100° F. and agitation was continued for one and one-half hours. At the end of this period the pH of the material was raised to 5.2 by the addition of a suitable quantity of sodium hydroxide. The liquor containing the modified protein soluble at this pH as well as some insoluble protein and other materials was then passed through a centrifuge to produce a clear solution which was subsequently spray dried in a stream of hot air.

The complete removal of insoluble protein prior to drying is desirable where a product with maximum whipping ability is required. However, it is satisfactory where the product is to be used in certain other applications, to dry the liquor in any suitable manner without removing the insoluble protein contained therein.

An analysis of the product resulting from the above operations wherein the step of centrifuging the insolubles from the solution is included, is as follows:

| | Per cent |
|---|---|
| Moisture | 4.9 |
| Protein (per cent N×6.25) | 68.2 |
| Ash | 16.9 |
| Nitrogen free extract | 10.0 |
| Non-protein nitrogen (per cent of total nitrogen) | 33.3 |
| Per cent of total nitrogen soluble at pH 4.5 | 87.5 |

While in the foregoing description, we have set forth certain specific steps and materials as illustrative of one successful process embodying the invention, it will be understood that such steps may be widely varied and equivalent materials employed without departing from the spirit of our invention.

We claim:

1. In a process for preparing modified soy protein, the steps of extracting soy protein stock with an aqueous solution having a pH of about 8-10.5, subjecting the material to a gravity separation to produce a suspension of insoluble material in the solution, drawing off the supernatant liquid from the suspension, lowering the pH of said liquid to precipitate glycinin curd, separating the precipitated curd, diluting the wet curd with water to bring the solids content below 7.5%, subjecting said diluted curd to the action of pepsin under temperature and hydrogen concentration conditions favorable to the action of pepsin, and drying the product.

2. In a process for preparing modified soy protein, the steps of extracting soy protein stock with an aqueous solution having a pH of about 8–10.5, subjecting the material to a gravity separation to produce a suspension of insoluble material in the solution, drawing off the supernatant liquid from the suspension, adding water to the suspension and agitating the suspension therein, subjecting the water and suspension mixture to a gravity separation to produce a suspension of insoluble material therein, drawing off the supernatant liquid, combining the two bodies of supernatant liquid, lowering the pH of the liquid to precipitate glycinin curd, diluting the precipitated glycinin curd to bring the solids content thereof below 7.5%, subjecting the diluted curd to the action of pepsin under temperature and hydrogen ion concentration favorable to the action of the pepsin, separating the insoluble material, and heating the solution to dry the product.

3. In a process for preparing modified soy protein, the steps in extracting soy protein stock with an aqueous solution having a pH of about 8–10.5, separating the insoluble material from the soluble material, lowering the pH of the solubles containing solution to precipitate glycinin curd, separating the precipitated curd and diluting the wet curd with water to bring the solids content below 7.5%, subjecting said curd to the action of pepsin under conditions of temperature and hydrogen ion concentration favorable to the action of pepsin, and drying the product.

LOUIS SAIR.
RICHARD RATHMAN.

REFERENCES CITED

The following references are of record in the file of this patent:

UNITED STATES PATENTS

| Number | Name | Date |
|---|---|---|
| 2,007,962 | Burrus et al. | July 16, 1935 |
| 2,194,835 | Nickerson | Mar. 26, 1940 |
| 2,217,264 | Weizmann | Oct. 8, 1940 |
| 2,364,008 | Stuart | Nov. 28, 1944 |
| 2,381,407 | Levinson | Aug. 7, 1945 |

FOREIGN PATENTS

| Number | Country | Date |
|---|---|---|
| 121,141 | Great Britain | Dec. 12, 1918 |

OTHER REFERENCES

Smith et al., Ind. and Eng. Chem., Dec. 1938, 30: 1414 to 1418.